Aug. 26, 1958 K. M. WATSON 2,849,376
TWO STAGE PROCESS FOR PRODUCING A HIGH OCTANE GASOLINE
Filed June 17, 1952
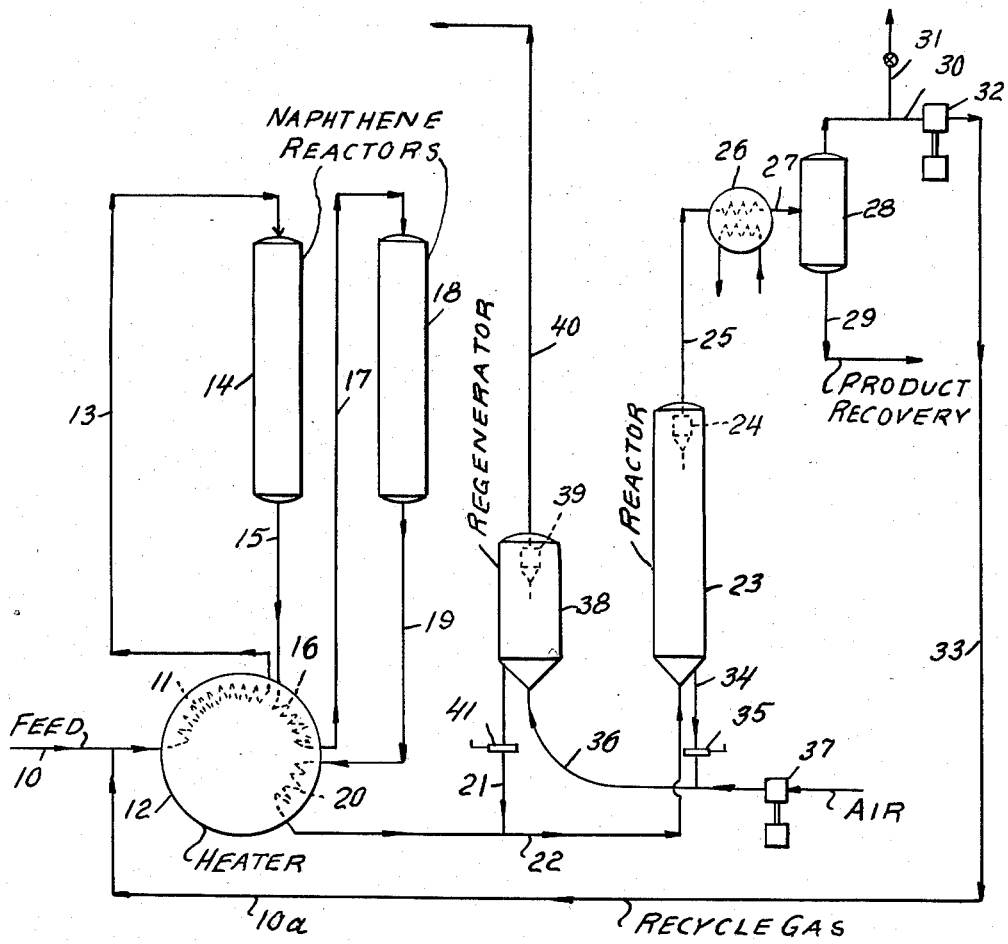
INVENTOR
KENNETH M. WATSON
BY
Adams, Forward and McLean
ATTORNEYS

United States Patent Office 2,849,376
Patented Aug. 26, 1958

2,849,376

TWO STAGE PROCESS FOR PRODUCING A HIGH OCTANE GASOLINE

Kenneth M. Watson, Lake Zurich, Ill., assignor to Sinclair Refining Company, New York, N. Y., a corporation of Maine Application June 17, 1952, Serial No. 293,883

2 Claims. (Cl. 196—50)

My invention relates to improvements in the reforming of light hydrocarbon stocks in the presence of hydrogen and a catalyst. In particular, it is directed to a two-stage catalytic hydroforming process designed to produce reformates of high octane level, i. e., 92 to 98 CFRR (clear), in improved yield.

The primary criteria in evaluating catalytic reforming processes for commercial application are the selectivity, activity and active life of the catalyst. Even with the best of catalysts however liquid recoveries fall off rapidly as reaction severity is increased to produce reformates of higher octane levels because of the variety of hydrocarbon reactions and inherent competition between reactions which occur under reforming conditions. Thus precious metal catalysts, i. e. platinum supported on alumina compositions, are highly active and selective in the conversion of naphthenes to aromatics in the presence of hydrogen and recycle gases at pressures in the range of 200 to 750 pounds and temperatures in the range of 850° to 950° F. Under these conditions naphthenes are isomerized to $C_6$ ring compounds which, together with the original $C_6$ ring compounds, are dehydrogenated to aromatics in high yield. Further processing produces added increases in the octane number of the naphtha charge by cyclization, dehydrogenation, isomerization and cracking of non-naphthenic components of the feed. However, the conversion of the non-naphthenic constituents is accompanied by deactivation of the catalyst and the production of carbonaceous residues and light hydrocarbon gases at an increased rate. The yield-octane number relationship of the resulting reformate tends to become economically unattractive due to the relatively large loss in yield of liquid product accompanying the octane number increase.

On the other hand, although certain base metal catalysts, such as molybdenum oxide on alumina or chromium oxide on alumina, are much less selective and active than platinum catalysts in conversion of naphthenes to aromatics, they are more selective in conversion of non-naphthenic constituents to produce increased octane number. For example, when charging a Pennsylvania naphtha, a platinum catalyst can produce 85 percent volume yield of 82 octane number reformate whereas a molybdenum catalyst can produce in the same yield a product of only 72 octane number. However, with increased severity of processing, the platinum catalyst produces only a 70 percent yield of 92 octane number whereas a molybdenum catalyst produces the same yield of 94 octane number, indicating a higher efficiency in the conversion of non-naphthenic constituents to high octane components. This difference in the slope of the yield-octane relationship tends to become more marked as the naphthene content of the charge is lower and as the octane number of the product is higher.

My invention is based upon application of these findings in a novel two-stage processing sequence in order to take full advantage of the unique characteristics of both types of catalysts. The bulk of the naphthenes in the charge stock are converted at mild conditions in the presence of a platinum type catalyst in the first reaction stage. For example, the hydrocarbon charge stock is reacted in the presence of hydrogen and a platinum-alumina catalyst at a temperature of about 850° to 950° F. and a pressure of 200 to 750 p. s. i. g. Depending on the naphthene content of the charge stock, the reaction is controlled to produce a reaction product or reformate of the order of about 75 to 85 octane number. The first stage reaction product without cooling or separation of recycle gas is then passed to the second reaction stage, in which it is contacted with a molybdenum oxide or chromium oxide type catalyst for conversion of the non-naphthenic residual constituents of the charge. Preferably, the reaction is conducted by handling the catalyst in a finely divided state under fluidized contact conditions. The reaction temperature may be the same or somewhat higher, e. g. about 925° to 975° F. The pressure approximates that of the first reaction stage although it may vary from about atmospheric to upwards of 500 to 750 p. s. i. g. The second stage reaction effluent is treated in the usual manner for separation of recycle hydrogen gas and for recovery of the reformate product. Operating in this manner, upwards of 70 percent yield of 96 to 98 octane number CFRR (clear) may be obtained. For example, the same Pennsylvania naphtha processed with a platinum type catalyst alone or with a molybdenum oxide type catalyst alone results in reformates of 92 to 94 octane number respectively for the same yield level. Hence by application of the process of my invention, a substantial yield-octane advantage results from application of each catalyst in the conversion range of its maximum selectivity.

My invention will be further described by reference to the accompanying drawing which illustrates in simplified diagrammatic form one system of application. The charge stock, for example a 200° to 350° F. virgin naphtha, is charged by means of line 10 in admixture with recycle hydrogen gas from line 10a to coil 11 of heater 12. The preheated stock in line 13 is passed through reactor 14 in contact with a platinum-alumina catalyst which, for example, is in the form of a fixed bed of granular particles or pellets. The effluent from reactor 14 is passed by means of line 15 to reheating coil 16 of heater 12 and then by means of line 17 is passed through second reactor 18 in contact with a second bed of platinum-alumina catalyst. The reaction effluent from reactor 18 by means of line 19 may be passed through another coil 20 of heater 12. The first stage reaction effluent then admixed with hot freshly regenerated catalyst from regenerator standpipe 21 is introduced by means of line 22 into reactor 23 in which a bed of molybdenum oxide-alumina catalyst in finely divided form is maintained in a fluidized state. The reactor design, amount of catalyst and flow of charge are correlated in the usual manner to provide a linear gas velocity within the range of 0.2 to 2.0 feet per second. Hydrocarbon vapors and gases disengaging from the catalyst bed leave reactor 23 through cyclone separator system 24 in line 25. After cooling in water cooler 26, the reactor effluent is passed by means of connection 27 to separator 28. From separator 28, a liquid stream is removed through connection 29 to the usual product recovery system. The fixed gases are removed from separator 28 by line 30 equipped with valved connection 31 for purging excess gas from the system and are passed to compressor system 32. The recompressed recycle gases are recycled through line 33 and 10a to feed line 10 and heater coil 11.

Although a single heater with several heating and reheating coils has been shown, it may be desirable to employ separate heaters. In the second stage, due to the necessity of regenerating the molybdenum oxide or chromium oxide type catalyst by carbon burn off in order to maintain its reforming activity at a high equilibrium level, the heat of regeneration may be employed as one source of heat through admixture of the regenerated catalyst with the feed to the second stage reactor. Thus as shown in the drawing, a stream of catalyst is continuously withdrawn from a lower portion of the bed in reactor 23 by means of reactor standpipe 34 under control of slide valve 35 and is dropped into regenerator riser 36. Air compressed by a blower or compressor system 37 picks up the catalyst in riser 36 and carries it into regenerator 38 where a bed of the catalyst is maintained in a fluidized state. Flue gases leave the regenerator overhead through cyclone system 39 and line 40 for disposal in the usual way. A stream of regenerated catalyst is continuously returned to reactor 23 through regenerator standpipe 21 under control of slide valve 41.

In the operation of the system, appropriate reforming conditions are selected in each stage to effect stagewise the desired conversion. In the first stage, for example, reactor inlet temperatures within the range of say 850° to 950° F. are desirable with a pressure within the range of about 200 to 750 p. s. i. g. A recycle ratio providing a hydrogen to hydrocarbon ratio of the order of about 2/1 to 10/1 should be maintained. A space velocity in terms of weight per hour of liquid feed per pound of catalyst of about 0.5 to 6 may be employed. A conversion level, which may be determined by extraneous tests on the feed stock, which will result in substantially complete conversion of naphthenes to aromatics should be obtained. Depending upon the original naphthenic content of the charge, an octane level of about 75 to 85 CFRR (clear) should be obtained by control of the reaction variables.

In the second reaction zone, a somewhat higher reaction temperature may be desirable, say in the range of about 925° to 975° F. although variation in space velocity, within the range say of 0.1 to 6.0 weight hourly space velocity provides a convenient means of control over the ultimate conversion.

The catalyst employed in the first reaction stage is a platinum-alumina catalyst or a platinum-alumina type catalyst promoted as by an acidic type promoter. A suitable catalyst may be prepared for example by incorporating about 0.1 to 1.0 weight percent of platinum and about 0.5 to 1.5 percent fluorine as fluoride ion in an alumina hydrate slurry. The catalyst mixture is dried, sized and calcined at about 800° to 1100° F. Before use, it is treated with a flowing stream of hydrogen at calcination temperatures. Other acidic promoters, if desired, are available such as small amounts of silica, zirconia, molybdena, sulfate, chloride and the like although as indicated above, unpromoted platinum-alumina catalyst compositions may be employed.

The catalyst for the second reaction stage may be one of the commercially available reforming catalysts of the type containing molybdenum or chrominum. The molybdenum type catalyst is preferred and a typical composition comprises about 10 percent molybdenum oxide incorporated in alumina by means of impregnation or coprecipitation. A typical catalyst of the chromium type is about 12 percent chromium oxide incorporated in alumina base.

Although the system illustrated in the drawing contemplates contacting in the first reaction stage with the catalyst in the form of a fixed bed contained in two reactors with reheating between reactors, a single reactor or additional reactors in series may be employed. Also the catalyst may be handled in finely divided form under fluidized conditions. In the second reaction zone, it is highly advantageous to handle the catalyst by the fluidized system in order to obtain optimum conversion results. Also it is necessary to regenerate the catalyst at relatively frequent intervals to maintain activity level and this operation is most satisfactorily performed by handling the catalyst in fluidized state or alternatively as a moving compact bed of granular or pelleted particles.

I claim:

1. A two-stage process for production of a high octane level reformate from a hydrocarbon reforming stock which comprises contacting the charge stock in the first stage in the presence of recycle hydrogen gas with a platinum-alumina type reforming catalyst at a temperature of about 850° to 950° F. and a pressure of 200 to 750 p. s. i. g. while controlling the extent of conversion at a level resulting in an octane level of about 75 to 85 CFRR (clear), contacting the first stage reaction effluent with a reforming catalyst selected from the group consisting of chromium oxide alumina and molybdenum oxide-alumina at a temperature of about 850° to 975° F. and a pressure of atmospheric to 750 p. s. i. g., separating hydrogen gas for recycle and recovering from the second stage reaction effluent the liquids products having an octane number of about 92 to 98 CFRR (clear).

2. A two-stage process for production of a high octane level reformate from a hydrocarbon reforming stock which comprises contacting the charge stock in the first stage in the presence of recycle hydrogen gas with a platinum-alumina type reforming catalyst at a temperature of about 850° to 950° F. and a pressure of 200 to 750 p. s. i. g. while controlling the extent of conversion to a level resulting in an octane level of about 75 to 85 CFRR (clear), contacting the first stage reaction effluent with a finely divided molybdenum oxide-alumina catalyst maintained in a fluidized condition at a temperature of about 850° to 975° F. and a pressure of atmospheric to 750 p. s. i. g., separating hydrogen gas for recycle and recovering from the reaction effluent the liquid products having an octane number of about 92 to 98 CFRR (clear).

References Cited in the file of this patent

UNITED STATES PATENTS

| | | |
|---|---|---|
| 2,249,337 | Visser et al. | July 15, 1941 |
| 2,304,183 | Layng et al. | Dec. 8, 1942 |
| 2,472,844 | Munday et al. | June 14, 1949 |
| 2,573,149 | Kassel | Oct. 30, 1951 |
| 2,596,145 | Grote | May 13, 1952 |
| 2,664,386 | Haensel | Dec. 29, 1953 |